(12) United States Patent
Marc (10) Patent No.: US 9,574,599 B2
(45) Date of Patent: Feb. 21, 2017

(54) SELF-LOCKING SEALING DEVICE (71) Applicant: JPB Systeme, Brie-Comte-Robert (FR)

(72) Inventor: Damien Marc, Nangis (FR)

(73) Assignee: JPB Systeme, Brie-Conte-Robert (FR)

( * ) Notice: Subject to any disclaimer, the term of this patent is extended or adjusted under 35 U.S.C. 154(b) by 0 days.

(21) Appl. No.: 14/033,975

(22) Filed: Sep. 23, 2013

(65) Prior Publication Data

US 2014/0056666 A1 Feb. 27, 2014

Related U.S. Application Data (63) Continuation-in-part of application No. PCT/FR2012/050463, filed on Mar. 6, 2012.

(51) Int. Cl.

| | |
|---|---|
| *F16B 39/22* | (2006.01) |
| *F16B 39/26* | (2006.01) |
| *F01D 21/00* | (2006.01) |
| *F02B 77/00* | (2006.01) |
| *F16B 39/24* | (2006.01) |

(Continued)

(52) U.S. Cl.
CPC ............ *F16B 39/22* (2013.01); *F01D 21/003* (2013.01); *F02B 77/005* (2013.01); *F16B 39/24* (2013.01); *F16B 39/26* (2013.01); *F16B 39/282* (2013.01); *F16L 55/1108* (2013.01); *F05D 2250/61* (2013.01); *F05D 2260/31* (2013.01); *F05D 2260/38* (2013.01); *F05D 2260/80* (2013.01); *F16L 2201/20* (2013.01); *Y02T 50/671* (2013.01)

(58) Field of Classification Search
CPC ................................. F16B 39/32; F16B 39/26
USPC .......................... 411/326–332, 322, 221, 6, 7
See application file for complete search history.

(56) References Cited

U.S. PATENT DOCUMENTS

| | | | | |
|---|---|---|---|---|
| 853,133 | A | * | 5/1907 | Smith ........................... 411/327 |
| 1,646,805 | A | | 10/1927 | Bell |

(Continued)

FOREIGN PATENT DOCUMENTS

| | | |
|---|---|---|
| FR | 2857080 A1 | 1/2005 |
| FR | 2952149 A1 | 5/2011 |

(Continued)

OTHER PUBLICATIONS

JPB Systeme; Internet You Tube Video entitled "Self locking Borescope Plug—Bouchon endoscope auto-freiné"; www.youtube.com/watch?v=PrryILyV9c; Feb. 19, 2009.

(Continued)

*Primary Examiner* — Flemming Saether
(74) *Attorney, Agent, or Firm* — Wood Herron & Evans LLP (57) ABSTRACT

The invention relates to a shut-off device comprising a plug intended to be placed over a threaded orifice of a casing, or to be removed therefrom, by screwing and unscrewing respectively, the plug comprising a central body bearing a screw thread, and locking and unlocking means that oppose the spontaneous unscrewing of the plug and that are activated automatically by the turning of the plug and its corresponding progression in the direction of screwing along a longitudinal axis. The locking and unlocking means comprise two releaseable coupling members, of which a first member is coupled to and turns with the central body via a protective skirt and of which a second member can be prevented from turning with respect to the casing during screwing.

50 Claims, 3 Drawing Sheets

(51) Int. Cl.
*F16B 39/282* (2006.01)
*F16L 55/11* (2006.01)

(56) References Cited

U.S. PATENT DOCUMENTS

| | | | | |
|---|---|---|---|---|
| 3,282,316 | A | * | 11/1966 | Griswold ............... F16B 2/12 248/503 |
| 3,942,570 | A | * | 3/1976 | Bochman et al. ............ 411/220 |
| 4,790,703 | A | * | 12/1988 | Wing ............................ 411/260 |
| 4,971,501 | A | | 11/1990 | Chavez |
| 5,013,197 | A | * | 5/1991 | Allaert et al. ................. 410/77 |
| 5,533,849 | A | * | 7/1996 | Burdick ........................ 411/120 |
| 5,823,702 | A | * | 10/1998 | Bynum ......................... 403/320 |
| 5,897,277 | A | * | 4/1999 | Barre et al. .................... 411/331 |
| 7,883,117 | B2 | | 2/2011 | Marc et al. |
| 8,540,470 | B2 | * | 9/2013 | Dillon et al. ................. 411/198 |
| 9,022,709 | B2 | * | 5/2015 | Benzing ........................ 411/150 |
| 2015/0063939 | A1 | * | 3/2015 | Marc ................................ 411/6 |

FOREIGN PATENT DOCUMENTS

| | | |
|---|---|---|
| JP | S616418 A | 1/1986 |
| JP | H0979247 A | 3/1997 |
| SU | 916792 A1 | 3/1982 |
| WO | 96/02766 A1 | 2/1996 |
| WO | 96/14516 A1 | 5/1996 |
| WO | 2012127146 A1 | 9/2012 |

OTHER PUBLICATIONS

European Patent Office; Search Report in International Patent Application No. PCT/FR2012/050463 dated Jun. 5, 2012; 6 pages.
European Patent Office; Search Report in European Patent Application No. 14184873.9 dated Jan. 26, 2015; 6 pages.
Japanese Patent Office; Office Action in Japanese Patent Application No. 2014-500440 dated Feb. 2, 2016; 7 pages.

* cited by examiner

SELF-LOCKING SEALING DEVICE

The present invention relates to a plug-type sealing device the screwing of which allows automatic locking, preventing spontaneous or untimely unscrewing.

In aviation, an aeroplane engine requires regular maintenance and a very rigorous inspection regime in order to ensure total reliability of the engine in operation. So that the internal parts as well as any wear thereof can be monitored, holes are provided in the engine case. During maintenance operations, a plug sealing the hole is unscrewed and a borescope can be inserted to probe the internal voids and inspect the condition of the engine parts. This avoids opening the case and completely dismantling the engine.

The commonly used plugs of this type, also called "borescope plugs", have a screw thread and are screwed into a corresponding thread in the case, using a torque wrench. When the engine runs, its operation generates vibration capable of causing screwed parts, and more particularly the borescope plugs, to loosen.

Various means for avoiding such a fault are known. These means can consist of placing an insert in contact with the plug, before or after tightening. The parts used are of the lock washer type, or the split pin or lockwire type.

However, the plugs in an engine can be poorly accessible, because tubing and other peripheral components occupy the space around the case. Thus, installing an additional braking or locking part onto a plug requires great dexterity, and even luck, to avoid losing said part. In some cases, the plug is only accessible using a long tool, any direct manual access to the plug being impossible when the plug is in place. A plug equipped with a braking system dealing with this type of problem is also known from document PCT/FR95/01461. Such a system comprises locking and unlocking means that are automatically activated by the rotation of the plug and its longitudinal movement along the axis of rotation. The locking and unlocking means are constituted by two rings (or cups) each comprising a series of teeth directed axially towards the other ring. The teeth have a pointed (or triangular) profile and mesh together during the axial movement of the plug. One of the rings is fixed on the case, in the document press-fitted onto the case so as to be immobilized in rotation. The other ring is incorporated into the plug and driven in rotation therewith when it is screwed into the hole in the case. This known plug requires the fitting of a ring onto the case, by press-fitting. This operation requires a special tool equipment.

It is noted particularly that the rotary coupling between one of the rings and the plug is obtained by mutually corresponding configurations made on the one hand on the ring and on the other hand on the central body of the plug. In the device described in said document, the ring comprises pins entering axially with respect to the direction of screwing into corresponding grooves configured on the central body of the plug, said pins being movable along said longitudinal axis. In a variant, similar devices are known in which the ring is coupled onto the periphery of the central body by a system of flat sections. These systems all require specific machining of the central body, which can in certain cases weaken it mechanically and/or be unsuitable in terms of achieving a compact (small space requirement) and optimized plug.

Moreover, the plug described in said document comprises means (helical compression spring urging the ring incorporated into the plug towards the ring in the case, asymmetrical profiles of the teeth configured on the rings, etc.), which although providing a response to the problem of untimely unscrewing, can still be optimized with respect to their form and function.

The purpose of the present invention is to propose an optimized variant of the plug as described previously, responding even more effectively to the need to prevent untimely unscrewing while simplifying the manufacturing and assembly constraints of the plug. The purpose of the invention is therefore also to propose a sealing device comprising a stopping system opposing any untimely unscrewing under the effect of the vibrations produced particularly by an aeroplane engine, which is directly incorporated into the sealing device, completely compact, and does not cause a hindrance or a risk to opening and closing operations, even in the event of poor accessibility.

To this end, a subject of the invention is a sealing device comprising a plug intended to be placed in a threaded hole in a case, or removed therefrom, respectively by screwing and unscrewing, the plug comprising a central body provided with a screw thread, and locking and unlocking means opposing the spontaneous unscrewing of the plug, activated automatically by the rotation of the plug and its corresponding movement in the direction of screwing along a longitudinal axis, the locking and unlocking means comprising two releasable coupling components, a first component of which is coupled in rotation with the central body and a second component of which can be immobilized in rotation with respect to the case during screwing, characterized in that the plug comprises a skirt rigidly connected to the central body and having a bearing zone capable of cooperating directly with a corresponding bearing zone of the second component, and in that the first component is coupled in rotation with the skirt via guide means configured on the periphery of the first component and extending radially with respect to the longitudinal axis, said guide means entering mutually corresponding grooves configured inside the skirt, which extend along the longitudinal axis so as to allow the displacement of the first component inside the skirt, along the longitudinal axis.

The central body of the plug can thus have a cylindrical outer profile that does not require any specific machining for driving the first component in rotation with the plug. In the invention, the rotary drive (or coupling) means are located between the first component and the skirt, which is itself rigidly fixed to the central body. The completely cylindrical profile of the central body allows the return means to be guided directly on said central body. The dimensions of the central body can be increased, particularly its diameter, while retaining an identical exterior space requirement of the plug. Moreover, the ring coupled in rotation with the plug is extremely compact, since it has no longitudinal pin or internal flat section.

According to further advantageous features of the invention, the guide means are constituted by at least two protrusions angularly distributed on the periphery of the second component, in particular in a diametrically opposed manner, each protrusion being delimited, on the one hand radially by a cylindrical outer profile having a diameter greater than the outer cylindrical surface of the first component, and on the other hand angularly by longitudinal edges inscribed within planes forming an angular sector about the longitudinal axis.

In this way the distribution of forces is optimum: during assembly or disassembly, the forces are thus always oriented perpendicular to a straight line passing through the longitudinal axis of the first component. The forces are thus applied in a completely tangential manner, without any radial component (i.e. projected on an axis that is radial with respect to the longitudinal axis). This makes it possible to avoid or limit the phenomena of "caulking" or even jamming of the first component during the assembly or disassembly phases. These phenomena are moreover likely to be amplified by an increase in the coefficient of friction of the materials as a result of pollution and/or corrosion occurring after high temperature operating cycles. Moreover, the forces are exerted as far away as possible from the longitudinal axis, allowing greater torque to be transmitted while avoiding or limiting the "caulking" phenomena.

According to yet further advantageous features of the invention, the angular sector has an angle comprised between 10 and 45°, particularly 30°.

According to further advantageous features of the invention, the radial height of the protrusions with respect to the longitudinal axis is greater than 1 mm, and is in particular comprised between 1 and 5 mm.

According to further advantageous features of the invention, the first component is movable with respect to the central body along the longitudinal axis, between the second component and an inner base of the skirt, the first component being urged towards the second component by resilient return means housed in the skirt.

According to further advantageous features of the invention, the central body comprises an axial stop against which the second component abuts under the force of the first component urged by the resilient return means.

According to further advantageous features of the invention, the axial stop is constituted by a collar machined on the central body.

According to further advantageous features of the invention, the resilient return means are constituted by a flat wire wave compression spring.

According to further advantageous features of the invention, the first component and the second component have generally annular shapes, the second component also comprising a projection extending radially with respect to the longitudinal axis, said projection carrying an immobilization lug directed parallel to the longitudinal axis, intended to enter a corresponding immobilization hole configured in the case.

According to further advantageous features of the invention, the first component and the second component comprise respective sets of teeth intended to mesh together during screwing/unscrewing.

According to further advantageous features of the invention, the sets of teeth have teeth with a symmetrical profile, the lateral faces of which are inclined particularly at 30°/30°.

According to further advantageous features of the invention, the sets of teeth have teeth with an asymmetrical profile, the lateral faces of which are oriented particularly at 30°/60°.

According to further advantageous features of the invention, in a first embodiment the central body comprises a rotation drive configuration for driving in rotation using a tool for screwing/unscrewing. This solution has the advantage of easy, cost-effective implementation.

According to still further advantageous features of the invention, the skirt comprises a rotation drive configuration for driving in rotation using a tool for screwing/unscrewing. This solution has the advantage of allowing a more compact sealing device to be produced. This solution also has the advantage of allowing a larger rotation drive configuration for the same space requirement of the plug, and therefore also of allowing smaller plugs to be produced with the same rotation drive configuration.

According to further features of the invention, when the skirt comprises a rotation drive configuration, the skirt is extended beyond the central body on the side remote from the screw thread and defines the drive configuration inside the skirt beyond the central body.

According to another object of the invention, there is provided a sealing device comprising a plug intended to be placed in a threaded hole in a case, or removed therefrom, respectively by screwing and unscrewing, the plug comprising:

a central body provided with a screw thread,
a skirt rigidly connected to the central body and having a bearing zone capable of transmitting tightening thrust to the case,
locking and unlocking means opposing spontaneous unscrewing of the plug, automatically activated by the rotation of the plug and its corresponding movement in the direction of screwing along a longitudinal axis, said locking and unlocking means comprising a first releasable coupling component coupled for common rotation with the central body and a second releasable coupling component which is capable of immobilization against rotation with respect to the case during screwing, wherein the first coupling component is coupled for common rotation with the central body via guide means configured on the periphery of the first component and extending radially with respect to said longitudinal axis, said guide means entering respectively corresponding grooves configured inside the skirt, which extend along the longitudinal axis so as to allow axial displacement of the first component inside the skirt.

Preferably, the second component is provided with a shaped element adapted to engage a corresponding formation provided on the case thereby to cause immobilization of the second component with respect to the case when the plug is being screwed in the threaded hole.

In a preferred embodiment, the second coupling component has a central bore provided with a catch and is mounted by an insertion of said screw thread through said bore followed by a displacement of said catch into a retaining position in which said catch precludes reverse movement of said screw thread out of said bore.

Said catch is preferably a plastically deformable lip.

Said displacement of said catch may be produced on termination of said insertion by an abutment of said catch against a proximal stop which is fast with said central body.

In an advantageous embodiment, said displacement of said catch is limited by said second coupling component abutting said bearing zone of said skirt.

Typically, an annular chamber is formed between said skirt and said central body and encloses said first coupling component and resilient return means urging said first coupling component towards said second component, and wherein said second coupling component sealingly closes said chamber when said catch abuts said proximal stop along an annular abutment line and said bearing zones abut each other along an annular bearing line.

It is preferred that said central body and said skirt are obtained from a single piece of metal.

When the bearing zones are in a mutual abutment an annular yieldable portion of the second coupling component preferably abuts a proximal stop of the central body.

Said yieldable portion is advantageously a deformable annular lip formed on a bore of the second coupling component.

Preferably, when an annular chamber is formed between said skirt and said central body and encloses said first coupling component and resilient return means urging said first coupling component towards said second component, said second coupling component sealingly closes said chamber when said yieldable portion abuts said proximal stop along an annular abutment line and said bearing zones abut each other along an annular bearing line.

According to a further object of the invention, a sealing device comprises a plug intended to be placed in a threaded hole, or removed therefrom, respectively by screwing and unscrewing, the plug comprising:
- a central body provided with a screw thread,
- locking and unlocking means opposing spontaneous unscrewing of the plug, automatically activated by the rotation of the plug and its corresponding movement in the direction of screwing along a longitudinal axis, the locking and unlocking means comprising a first releasable coupling component coupled for common rotation with the central body and a second coupling component which can be immobilized in rotation with respect to the threaded hole during screwing, wherein the second coupling component has a central bore provided with a catch and is mounted by an insertion of said screw thread through said bore followed by a displacement of said catch into a retaining position in which said catch precludes reverse movement of said screw thread out of said bore.

According to still another object of the invention, there is provided a releasable self-locking device for resisting untimely unscrewing of a screw connection between a first threaded element and a second correspondingly threaded element, the device comprising a first and a second releasable coupling components which are mounted onto the first threaded element, said first releasable coupling component being coupled for common rotation with the first threaded element and said second coupling component being supported with a possibility of rotation and axial displacement on the first threaded element and being capable of being immobilized against rotation with respect the second threaded element during screwing, a resilient return means axially biasing the first releasable coupling component into engagement with the second releasable coupling component and consequently biasing the second coupling component into axial engagement with a distal stop of the first threaded element or, when a certain amount of screwing has been performed, against the second threaded element, wherein the first threaded element is provided with a proximal stop limiting axial movement of the second coupling component in a direction away from the distal stop.

Preferably, the second coupling component comprises a radial protrusion having two opposed faces for engagement of the distal stop and of the proximal stop, respectively.

In an advantageous embodiment, the radial protrusion is given its operative shape by a plastic deformation against said proximal stop under an axial thrust, said radial protrusion being before said plastic deformation able to move beyond said distal stop.

Said second coupling component is preferably operable as a distance part between the two threaded elements when they are tightened against each other by screwing.

In a preferred embodiment, the abutment of the second coupling component against the proximal stop has a flexibility which is limited by a rigid abutment of the second coupling component onto a bearing zone of the first element when the second coupling component operates as said distance part.

Preferably, said first threaded element is provided with a blind annular chamber containing the resilient return means and the first coupling component, and the second coupling component is capable of closing said chamber when the second coupling element is in contact with the first threaded element at the proximal stop along an annular inner edge of said chamber and in at a bearing zone provided along an annular outer edge of said chamber.

Said chamber is preferably formed between a central body and a skirt of the first coupling element, said central body and said skirt formed together from a single piece of metal.

According to a further object of the invention, there is provided a releasable self-locking screw connection device adapted for resisting unwanted unscrewing, said screw connection comprising a first threaded element and a second correspondingly threaded element, the first element comprising:
- a central body provided with a screw thread,
- a skirt rigidly connected to the central body and having an annular bearing zone capable of transmitting tightening thrust to the second threaded element,
- an annular chamber formed between the skirt and the central body and opening towards the screw thread,
- locking and unlocking means opposing spontaneous unscrewing of the plug, said locking and unlocking means mounted at least partly inside the chamber and automatically activated by the rotation of the plug and its corresponding movement in the direction of screwing along a longitudinal axis, said locking and unlocking means comprising a first releasable coupling component coupled for common rotation with the central body and a second releasable coupling component which is rotatable and captive onto said central body and provided with a means of immobilization against rotation with respect to the second threaded element during screwing.

Typically, the first component is movable with respect to the central body along the longitudinal axis, between the second component and an inner base of the skirt, the first component being urged towards the second component by resilient return means housed in the skirt.

The central body may comprise a distal axial stop against which the second component abuts at a distal extremity of a stroke of said second component, under the force of the first component urged by the resilient return means.

The second component is preferably provided with a shaped element adapted to engage a corresponding formation provided on the case thereby to cause immobilization of the second component with respect to the case when the plug is being screwed in the threaded hole.

Preferably, the skirt bearing zone transmits the tightening pressure to the second threaded element via the second coupling component operable as a distance part between the skirt and the second threaded element.

According to a still further object of the invention, there is provided a releasable self-locking screw connection device adapted for resisting unwanted unscrewing, said screw connection comprising a first threaded element and a second correspondingly threaded element, the first element comprising:
- a central body provided with a screw thread,
- a skirt rigidly connected to the central body and having an annular bearing zone capable of transmitting tightening thrust to the second threaded element,
- an annular chamber formed between the skirt and the central body and opening towards the screw thread,
- locking and unlocking means opposing spontaneous unscrewing of the plug, said locking and unlocking means mounted at least partly inside the chamber and automatically activated by the rotation of the plug and its corresponding movement in the direction of screwing along a longitudinal axis, said locking and unlocking means comprising a first releasable coupling component coupled for common rotation with the central body via guide means configured on the periphery of the first component and extending radially with respect to said longitudinal axis, said guide means entering respectively corresponding grooves configured inside the skirt, which extend parallel to the longitudinal axis so as to allow axial displacement of the first component inside the skirt.

Other features and advantages of the invention will become apparent from the following description of embodiments of the invention which are in no way limitative, and the attached drawings, in which.

As these embodiments are in no way limitative, it is possible in particular to envisage variants of the invention comprising only a selection of features described below, in isolation from the other features described, if said selection of features is sufficient to confer a technical advantage or to differentiate the invention with respect to the state of the prior art. Said selection comprises at least one, preferably functional, feature without structural details, or with only some of the structural details if this part only is sufficient to confer a technical advantage or to differentiate the invention with respect to the state of the prior art.

Firstly, a first embodiment of the invention will be described with reference to FIGS. 1 to 4.

Figure 1:
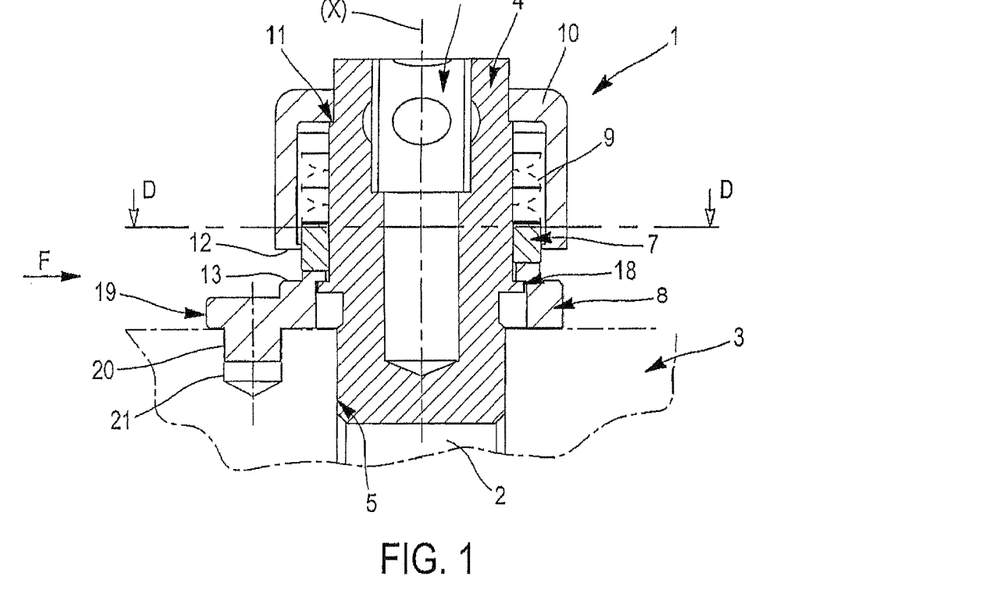
FIG. 1 is a cross-sectional view of a first embodiment of a sealing device according to the invention.

According to the invention, the sealing device comprises a plug 1 intended to be placed in a threaded hole 2 of a case 3, or removed therefrom, respectively by screwing and unscrewing. For example, the threaded hole 2 is formed in a boss on the case 3 of an engine. The screw threads are standard and in particular do not comprise any interruption such as an axial groove or a flat section. The plug 1 comprises a central body 4 having the general form of a shaft, provided at one end with a screw thread 5, and at the opposite end with a rotary drive recess or configuration 6 for driving the central body 4 in rotation using a tool for screwing/unscrewing (not shown). In the example shown, the rotary drive configuration is a 4-sided female portion intended to receive a corresponding 4-sided male wrench for screwing and unscrewing. Alternatively (not shown), the rotation drive configuration can be a hexagonal female portion intended to receive a corresponding male hexagonal wrench for screwing and unscrewing. A predetermined tightening torque can be ensured by using a torque wrench. In a variant (not shown), provision can be made for said portion to be replaced by a male configuration on the outside of the central body 1.

The plug 1 also comprises locking and unlocking means opposing the spontaneous unscrewing of the plug 1, activated automatically by the rotation of the plug 1 and its corresponding movement in the direction of screwing along a longitudinal axis (X). Thus, during the movement of the plug to and from the closed position, the respective locking and unlocking means are brought progressively into action, concomitantly with the movement, without any intervention by the operator. The locking and unlocking means comprise two releasable coupling components: a first component 7 is coupled in rotation with the plug 1 and a second component 8 can be immobilized in rotation with respect to the case 3 during screwing. Preferably, these coupling means are of the reversible detent type. By "reversible detent" is meant a detent capable of being released by application of sufficient force on the plug in the direction of screwing or unscrewing.

Particularly advantageously, the locking and unlocking are carried out by locking and unlocking means, more precisely by releasable coupling components comprising a first component 7 coupled in rotation with the central body 4 of the plug 1 and a second component 8 capable of being immobilized in rotation with respect to the case 3 during the screwing of the central body 4 into the hole 2 in the case 3. These locking and unlocking means are arranged around the central body 4.

The first and second components 7, 8 each comprise a toothed profile directed towards the opposite component. The teeth are precisely configured on respective annular faces of the first 7 and second 8 components opposite each other. In order to avoid unintentional loosening by vibration and allow intentional loosening of the plug by the operator, the toothed profile of the first component 7 is applied via a spring 9 against the identical toothed profile of the second component 8. This results in meshing of the teeth, which opposes the spontaneous rotation of the plug 1.

Moreover, during assembly or disassembly, the operator feels the click-click operation of the device, and can therefore be satisfied with the correct operation of the locking system.

Remarkably, the first and second components 7, 8 are both built into the plug and are inseparable therefrom.

The plug 1 comprises a cylindrical protective skirt 10 rigidly connected to the central body 4. Said skirt 10 is typically press-fitted/crimped onto the central body 4 by its end comprising the rotary drive configuration 6, up to a positioning and locking shoulder 11 configured on the external periphery of the central body 4. By the term "rigidly connected" is meant that the skirt fits perfectly over the central body, without any degree of freedom. In a variant embodiment of the invention (not shown), the skirt can also be welded onto the central body.

The skirt comprises a bearing zone 12 capable of cooperating directly in abutment with a corresponding bearing zone 13 of the second component 8. The first component 7 is coupled in rotation with the skirt 10 via guide means 14, 15 configured on the periphery of the first component 7 that extend radially with respect to the longitudinal axis X. Said guide means 14, 15 enter grooves 16 that have a corresponding shape and are formed on the inside of the skirt 10. The grooves 16 extend along the longitudinal axis X so as to allow the displacement of the first component 7 on the inside of the skirt, along the longitudinal axis X. Consequently, the first component 7 is also called a "movable part" or "movable cup" owing to its degree of freedom along the axis X. It is noted that the first component 7 has the general shape of a cup, ring, or hoop.

Figure 2:
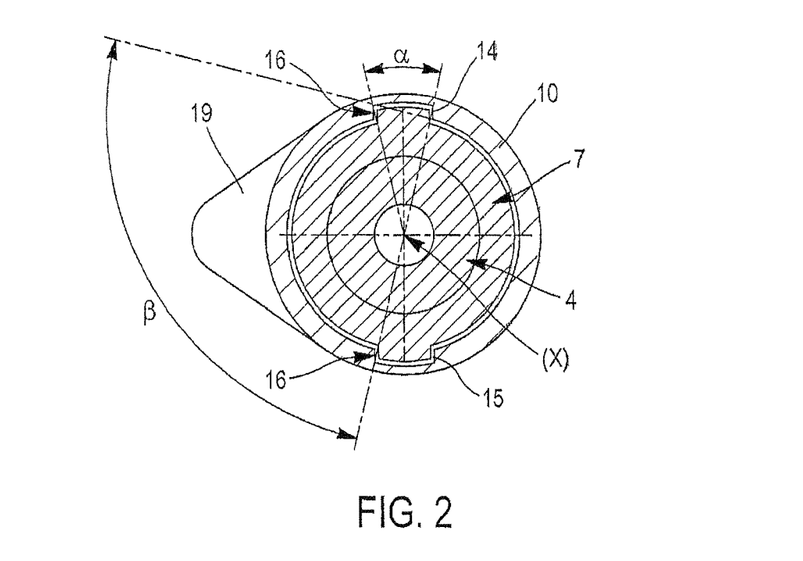
FIG. 2 is a cross-sectional view of the device in FIG. 1 along line D-D.

The guide means 14, 15 are constituted by at least two protrusions angularly distributed on the periphery of the first component 7, each protrusion being delimited, on the one hand radially by a cylindrical outer profile having a diameter greater than the outer cylindrical surface of the first component 7, and on the other hand angularly, by longitudinal edges inscribed within planes forming an angular sector about the longitudinal axis X. Said angular sector delimiting the protrusions on the guide means has an angle □ typically comprised between 10 and 45°, for example 30° as shown in FIG. 2. The height of said protrusions, considered radially with respect to the longitudinal axis X, is preferably greater than 1 mm, and is for example comprised between 1 and 5 mm. The forces transmitted from the skirt 10 to said guide means 14, 15 (by acting on the central axis 4 during screwing or unscrewing) are very advantageously directed along tangents to the first component 7, so that no radial component is induced during screwing/unscrewing. In the example shown in FIG. 2, two diametrically opposed guide means are provided. In this case, an angle □ typically 90°, is observed between the directly stressed longitudinal edges, whether on screwing or on unscrewing. In variant embodiments of the invention (not shown), provision can be made for more than two guide means, for example three guide means angularly distributed about the longitudinal axis X.

According to the invention, the first component 7 is movable in translation with respect to the central body 4 between the second component 8 and an inner base of the skirt 10, the first component 7 being urged towards the second component 8, towards the opening of the skirt 10, away from the inner base, under the influence of a spring 9 situated around the central body 4. The central body 4 comprises an axial stop 18 against which the second component 8 abuts under the force of the first component urged by the spring 9. In the example shown, said axial stop 18 is constituted by a collar machined on the periphery of the central body 4, against which an inner shoulder of the second component 8 abuts. In a variant (not shown), provision can be made for the collar to be replaced by a resilient ring.

The second component 8 rotates freely with respect to the central body 4. However, it can be immobilized in rotation with respect to the case 3 during screwing. The second component 8 has a generally annular shape. It comprises a protrusion 19 extending radially with respect to the longitudinal axis X. Said protrusion 19 bears an immobilization lug 20 directed parallel to the longitudinal axis X. The lug 20 is intended to enter a corresponding immobilization hole 21 configured in the case 3.

Figure 3:
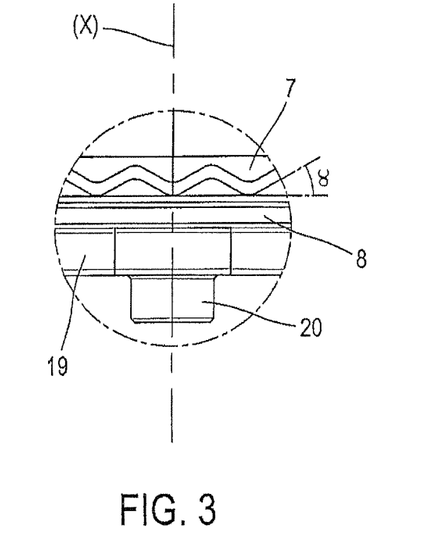
FIG. 3 is an enlarged view of a production detail E of the sealing device according to the invention as shown in FIG. 4.
Figure 4:
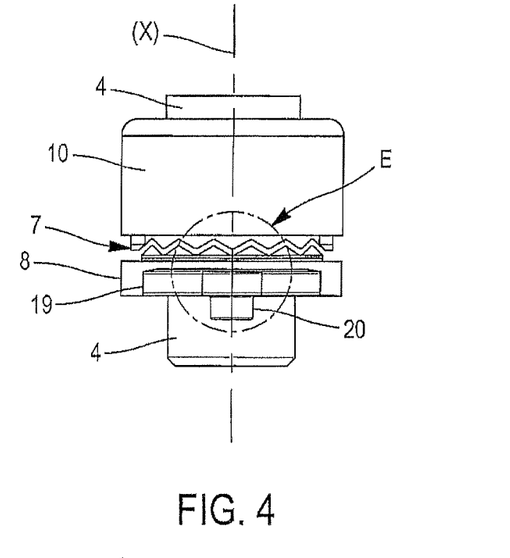
FIG. 4 is an external view of the sealing device according to the invention, as shown in view F of FIG. 1.

During screwing of the central body 4 into the threaded hole 2, the second component 8 at first follows the rotary movement of the plug 1. When the screwing has reached a certain stage, the lug comes into contact with the external surface of the case 3, while still turning, until it reaches a position facing the immobilization hole 21. Any additional movement of the plug along the longitudinal axis X during screwing causes a corresponding forward movement of the lug into the locking hole, until the second component 8 matches the external surface of the case 3. An additional movement of the central body 4 towards the case along the longitudinal axis X during screwing causes the respective sets of teeth of the first 7 and second 8 components to mesh together intermittently. The group (or set) of teeth of the first component 7 is driven in rotation with the plug while the group (or set) of teeth of the second component 8 is at this stage immobilized in rotation with respect to the case 3. During the relative rotation between the two groups of teeth, the latter are alternately in a meshing configuration and a tip-to-tip configuration, the change from one configuration to the other being carried out by relative sliding of the respective adjacent faces of the two groups of teeth. The first component 7 therefore carries out translations along the longitudinal axis X, inside the skirt 10, towards the rear (recess 6) and towards the front (threaded hole 2) during the screwing of the plug, which is similar to an oscillation movement. Each translation takes place over a stroke corresponding to the height of the teeth, the distance separating the tip of a tooth from the hollow between two teeth, as measured along the longitudinal axis X. It is noted that the teeth preferably have a symmetrical profile, i.e. identical inclinations of the sliding surfaces acting on tightening or loosening, in order to optimize the life of the system and better control the coefficients of friction. A suitable symmetrical tooth profile has for example inclinations of 30°/30° on either side of each tooth. These angles □ are considered with respect to a plane perpendicular to the longitudinal axis X (FIG. 3). In another embodiment (not shown), the teeth can have an asymmetrical profile, particularly to give a coefficient of friction that is greater in one direction than in the other. A suitable asymmetrical tooth profile has for example inclinations of 30°/60° on either side of each tooth.

The spring 9 is preferably a flat wire wave compression spring. Such a spring has a very small space requirement and allows the plug to be made considerably lighter, in comparison with a similar plug provided with a helical compression spring.

The plug is assembled as follows: the elements are placed on the central body via its rear end, situated on the side of the recess or rotary drive configuration 6. The second component 8 is installed first, around the central body 4. The first component 7 is then installed around the central body 4 and stacked on the second component 8, with sets of teeth against each other. The spring 9 is then installed around the central body and applied against the first component 7. The protective skirt 10 is then press-fitted or crimped around the central body and said components 8, 7, 9. The skirt 10 provides protection at the same time, by constituting the outer casing of the plug, and the rotary coupling (or drive) between the central body 4 and the first component 7. It is noted that the first component and the second component have very compact external shapes, particularly in the direction of the longitudinal axis X. Their thickness in this direction can be less than 10-15 mm. For example, the first component can have a thickness comprised between 5 and 10 mm. These examples are in no way limitative. The type of spring used, the compactness of the first and second components as well as the rotary drive means used between the first component and the skirt give the plug a particularly reduced weight and space requirement that are able to satisfy very exacting demands.

Figure 5:
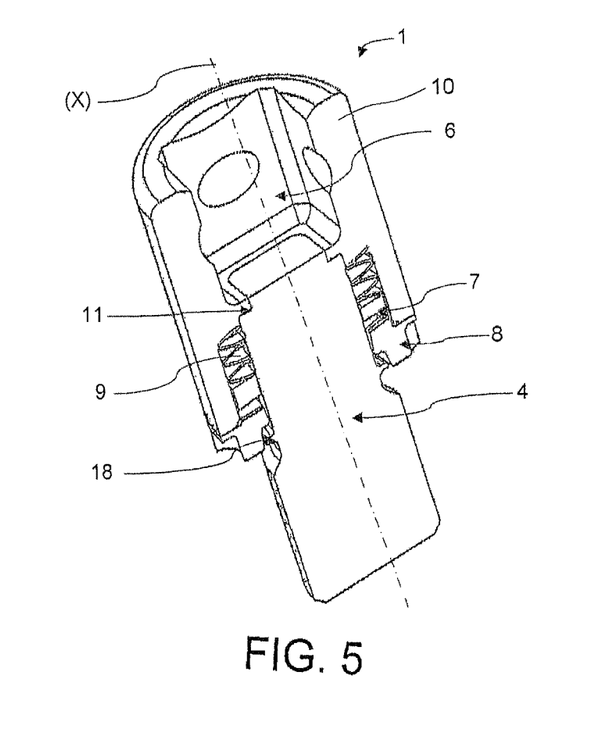
FIG. 5 is a cross-sectional view of a second embodiment of a sealing device according to the invention.

With reference to FIG. 5, a second embodiment of the invention will now be described, but only to the extent that it differs from the first embodiment previously described.

The skirt 10 comprises a rotary drive configuration 6 for driving in rotation using a tool for screwing/unscrewing. The configuration 6 is formed at the centre of the skirt 10 along the longitudinal axis (X) of the skirt. In the example shown, the rotary drive configuration is a 4-sided female part intended to receive a corresponding 4-sided male wrench for screwing and unscrewing.

In the example shown, on the side remote from the screw thread of the central body 4, the skirt is extended beyond the end of the central body 4. The part of skirt that thus extends beyond the central body 4 comprises a non-circular radially internal wall that defines the rotation drive configuration 6. Advantageously, the base of the rotation drive configuration is hermetically sealed by the end of the central body 4.

The skirt 10 is typically press-fitted/crimped onto the central body 4 at the longitudinal end of the skirt 10 corresponding to the base of the rotation drive configuration 6, up to a positioning and locking shoulder 11 configured on the outer periphery of the central body 4. Typically the positioning and locking shoulder 11 has a geometrical shape, particularly substantially square as shown in the example in FIG. 5, which fits tightly over a corresponding profile of the central body 4. By the term "rigidly connected" is meant that the skirt fits perfectly over the central body, without any degree of freedom. In an embodiment of the invention (not shown), the skirt can also be welded onto the central body.

With reference to FIG. 6-10, a third embodiment of the invention will now be described, but only to the extent that it differs from the first embodiment previously described.

Figure 6:
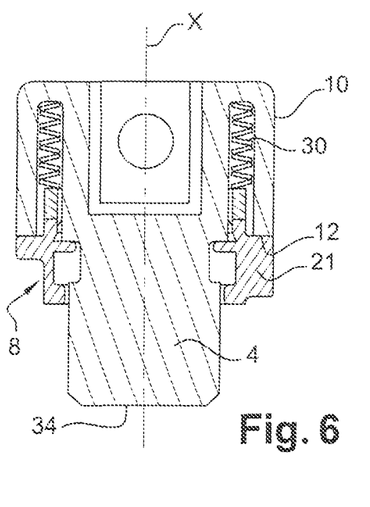
FIGS. 6 and 7 are cross-sectional views of a third embodiment of the plug, in the tightened and in the untightened condition respectively.
Figure 7:
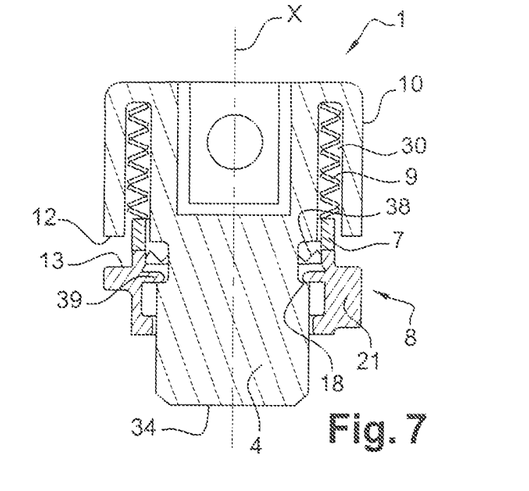
Figures 8, 9, 10:
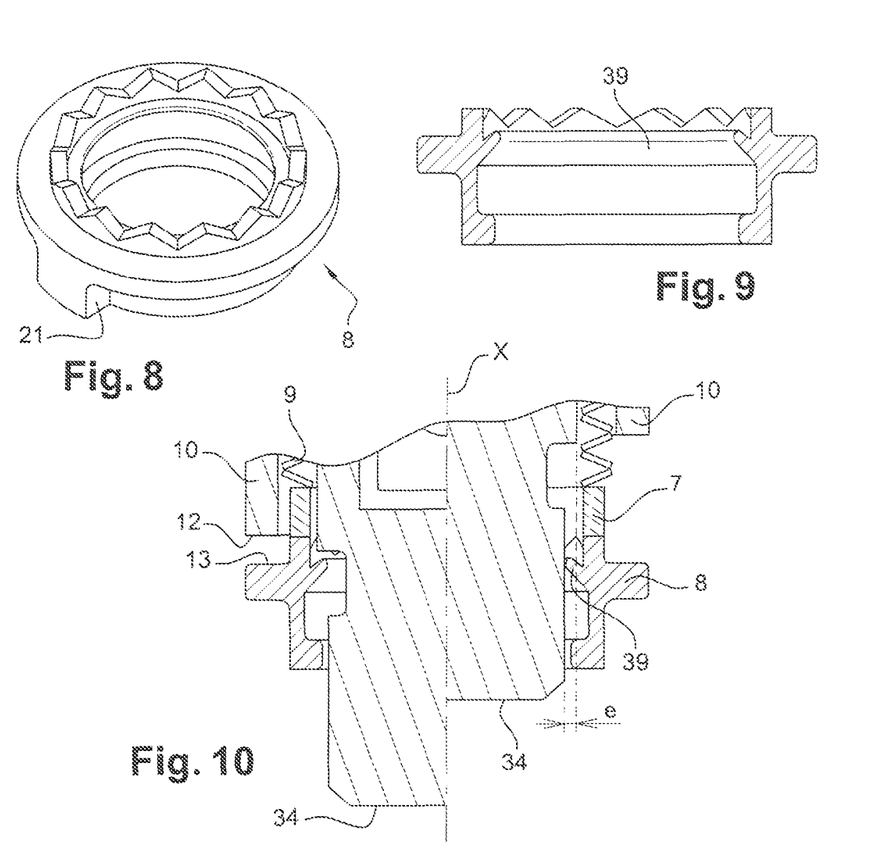
FIG. 8 is a perspective view of the second coupling component of the third embodiment.
FIG. 9 is a cross-sectional view of the second coupling component with the catch in its retracted position.
FIG. 10 is a cross-sectional view of the plug, made of two half-views at two different stages of assembly of the plug.

In the third embodiment the first and the second components for releasable coupling 7, 8 and the resilient return means 9 are mountable onto the central body 4 by insertion of the distal end 34, remote from the skirt 10 and close to the screw thread 5 of the central body 4, through the central bores of the return means 9 and of the first and second coupling components 7, 8, in a manner which will be described later. This allows the skirt 10 and the central body 4 to be obtained from a single piece of metal, as shown, while the outer diameter of the skirt 10 is greater than the inner diameters of the return means 9 and of the first and second coupling components 7, 8. Thanks to this arrangement, the plug 1 is structurally stronger and yet more compact.

The bore of the second coupling component 8 is provided with a radially inwardly protruding catch 39 which is axially captive between the distal stop 18 of the central body 4 and a proximal stop 38 also provided on the central body 4 and limiting axial travel of the catch 39 towards the skirt 10. In the illustrated example, the catch 39 is in the form of a plastically deformable lip which extends continuously around the axis X. Preferably both stops 18, 38 are provided by opposed annular shoulders or the central body 4, facing each other.

During mounting, once the return means 9 and the first and second coupling components 7, 8 have been slid over the central body 4 beyond the distal stop 18, the catch 39 is displaced from an initial, radially retracted position (FIGS. 9 and 10) allowing this movement, into the radially protruding position shown in FIGS. 6 and 7, in which the catch 39 precludes extraction of the central body by abutting the distal stop 18 and precludes movement of the catch 39 towards proximal beyond the proximal stop 38, whereas the return means 9 and the first coupling component 7 have respective central holes sufficiently wide for movement beyond the proximal stop 38.

In the example, displacement of the catch from its retracted position into its protruding position is obtained by plastic bending of the catch 39 from an oblique position with respect to the axis X (FIGS. 9 and 10), into a substantially radial (or at least less oblique) orientation (FIGS. 6 and 7) in which its open diameter is smaller. Though bendable under sufficient force, the catch 39 is rigid enough to withstand the force of the return means 10 without noticeably bending when the return means urge the catch 39 into abutment against the distal stop 18.

According to an advantageous embodiment of the invention, the proximal stop 38 has a larger outer diameter than the open diameter of the catch 39 in the retracted position. There is accordingly a radius difference $e$ (FIG. 10) between the outer radii of both stops 18, 38, and the radius of the aperture defined by the catch 39 in its retracted position is intermediate between both above-cited radii. Moreover, in its retracted position, the catch points obliquely towards the proximal stop 38. Thus, when the second coupling component 8 is being inserted over the central body 4 with the catch 39 in its retracted position (right-hand part of FIG. 10), movement continues until the catch 39 abuts the proximal stop 38 (left-hand part of FIG. 10). Then an axial force is exerted on the second coupling component 8 with respect to the central body 4 to continue the insertion movement, thereby to cause displacement, i.e. plastic bending of the catch 39 into its protruding position.

Advantageously, the proximal stop 38 and the bearing zone 12 of the skirt 10 are axially positioned with respect to each other so that short after the catch 39 has reached its desired protruding position, the bearing zones 12, 13 of the second coupling component 8 and of the skirt 10 rigidly abut each other, thus preventing excessive deformation of the catch 39.

After such mounting has occurred and the catch 39 is in its protruding, retaining position, reverse movement of the central body 4 out of the return means 9, first component 7 and second component 8 is prevented because the catch 39 in its retaining position abuts the distal stop 18.

During tightening of the plug 1 (FIGS. 6 and 7) into the threaded hole (not shown), the second coupling component 8 initially in the position shown in FIG. 7 is progressively pushed back towards the skirt 10 until the catch 39 abuts the proximal stop 38. Then the catch 39 resiliently bends somewhat until both bearing zones 12, 13 abut each other (FIG. 6). In this situation, the second coupling component 8 fully closes the blind chamber 30 formed between the central body 4 and the skirt 10, in which the return means 9 and the first coupling component 7 are accommodated and, when the plug is tightened, protected from pollution and dirt.

The closure of the chamber 30 by the second coupling component 8 is obtained by the substantially tight annular contact between both bearing zones 12, 13 along an outer edge of the chamber 30, and the substantially tight annular contact between the catch 39 and the proximal stop 38 along an inner edge of the chamber 30.

Of course, the invention is not limited to the embodiments previously described and comprises all the technical equivalents of the means presented.

In particular, it was stated previously that the invention relates to a sealing device comprising a borescope plug, said device being intended to close an appropriate hole through which access can be gained to the inside of the case. The device of the invention relates more generally to any sealing device comprising a plug such as described previously, whether or not said plug has other features or functionalities. For example such a sealing device according to the invention can of itself constitute a thermal sensor, a vibration sensor, a particle detector (chip detector) or any other detection means.

Moreover, the skirt 10 as described previously is for example rigid, i.e. cannot be deformed in compression along the longitudinal axis of screwing. The rigid skirt forms a brace supported on the bearing zone 13 of the second component 8. In another embodiment of the invention, the skirt can conversely be resilient, i.e. its structure configured to be capable of deformation at least in compression along the longitudinal axis of screwing. To this end, it can comprise pierced, slotted or folded zones allowing it to be deformed and to return to its original shape after the release of the compression forces. Such a resilient skirt further optimizes the safety of the system by increasing the resilient reserve during tightening. It also makes it possible to reduce the phenomena of seizing of the screw thread by limiting/calibrating the tightening force to a predetermined value.

Moreover, the stroke of the first component 7 inside the skirt 10 can be adapted according to need.

While the invention has been described in examples of a plug adapted to seal a threaded case hole, especially a borescope hole, it is intended that the invention is applicable to self-locking devices for releasably locking against unwanted unscrewing a first threaded element which is adapted to be screwed and tightened by screwing into a threaded hole of a second threaded element, and to connecting devices so-equipped, such as a threaded bolt adapted to be screwed and tightened onto a second element. Said second element may be a single element or may be an assembly, in the sense that it can comprise for example a first part with an unthreaded through-hole and a second part which is remote from the coupling components and the bolt head and is provided with a screw thread flush with the unthreaded through-hole, whereby screwing of the bolt tightens both parts against each other while the self-locking device according to the invention secures the bolt against unwanted unscrewing.

The invention claimed is:

1. A sealing device comprising a plug intended to be placed in a threaded hole in a case, or removed therefrom, respectively by screwing and unscrewing, the plug comprising:
   a central body provided with a screw thread,
   a skirt rigidly connected to the central body and having a bearing zone capable of transmitting tightening thrust to the case,
   locking and unlocking means opposing spontaneous unscrewing of the plug, automatically activated by the rotation of the plug and its corresponding movement in the direction of screwing along a longitudinal axis, said locking and unlocking means comprising a first releasable coupling component coupled for common rotation with the central body and a second releasable coupling component captive on the central body and capable of immobilization against rotation with respect to the case during screwing, wherein the first coupling component is coupled for common rotation with the central body via guide means configured on the periphery of the first component and extending radially with respect to said longitudinal axis, said guide means entering respectively corresponding grooves configured inside the skirt, which extend along the longitudinal axis so as to allow axial displacement of the first component inside the skirt,
   wherein the skirt bears against the second releasable coupling component to transmit tightening thrust to the case.

2. The sealing device according to claim 1, wherein the guide means are constituted by at least two protrusions angularly distributed on the periphery of the first component, about the longitudinal axis, in particular in a diametrically opposed manner, each protrusion being delimited, on the one hand radially by a cylindrical outer profile having a diameter greater than the outer cylindrical surface of the first component, and on the other hand angularly by longitudinal edges inscribed within planes forming an angular sector about the longitudinal axis.

3. The sealing device according to claim 2, wherein the angular sector has an angle comprised between 10 and 45 degrees.

4. The sealing device of claim 3, wherein the angular sector has an angle of 30 degrees.

5. The sealing device according to claim 2, wherein the radial height of the protrusions with respect to the longitudinal axis is greater than 1 mm.

6. The sealing device of claim 5, wherein the radial height of the protrusions is between 1 mm and 5 mm.

7. The sealing device according to claim 1, wherein the first component is movable with respect to the central body along the longitudinal axis, between the second component and an inner base of the skirt, the first component being urged towards the second component by resilient return means housed in the skirt.

8. The sealing device according to claim 7, wherein the central body comprises a distal axial stop against which the second component abuts at a distal extremity of a stroke of said second component, under the force of the first component urged by the resilient return means.

9. The sealing device according to claim 8, wherein the distal axial stop is constituted by a collar machined on the central body.

10. The sealing device according to claim 7, wherein the resilient return means are constituted by a flat wire wave compression spring.

11. The sealing device according to claim 1, wherein the second component is provided with a shaped element adapted to engage a corresponding formation provided on the case thereby to cause immobilization of the second component with respect to the case when the plug is being screwed in the threaded hole.

12. The sealing device according to claim 1, wherein the first component and the second component have generally annular shapes, the second component also comprising a projection extending radially with respect to the longitudinal axis, said projection carrying an immobilization lug directed parallel to the longitudinal axis, intended to enter a corresponding immobilization hole configured in the case.

13. The sealing device according to claim 1, wherein the first component and the second component comprise respective sets of teeth intended to engage each other during screwing/unscrewing.

14. The sealing device according to claim 13, wherein the sets of teeth have teeth with a symmetrical profile, the lateral faces of which are inclined.

15. The sealing device of claim 14, wherein the lateral faces of the teeth are inclined at 30 degrees and 30 degrees, respectively.

16. The sealing device according to claim 13, wherein the sets of teeth have teeth with an asymmetrical profile, the lateral faces of which are inclined.

17. The sealing device of claim 16, wherein the lateral faces of the teeth are inclined at 30 degrees and 60 degrees, respectively.

18. The sealing device according to claim 1, wherein the central body comprises a rotary drive configuration for driving in rotation using a tool for screwing/unscrewing.

19. The sealing device according to claim 1, wherein the skirt comprises a rotary drive configuration for driving in rotation using a tool for screwing/unscrewing.

20. The sealing device according to claim 19, wherein the skirt is extended beyond the central body on the side remote from the screw thread and defines the drive configuration inside the skirt beyond the central body.

21. The sealing device according to claim 1, wherein the second coupling component has a central bore provided with a catch and is mounted by an insertion of said screw thread through said bore followed by a displacement of said catch into a retaining position in which said catch precludes reverse movement of said screw thread out of said bore.

22. The sealing device according to claim 21, wherein said catch is a plastically deformable lip.

23. The sealing device according to claim 21, wherein said displacement of said catch is produced on termination of said insertion by an abutment of said catch against a proximal stop which is fast with said central body.

24. The sealing device according to claim 23, wherein said displacement of said catch is limited by said second coupling component abutting said bearing zone of said skirt.

25. The sealing device according to claim 23, wherein an annular chamber is formed between said skirt and said central body and encloses said first coupling component and resilient return means urging said first coupling component towards said second component, and wherein said second coupling component sealingly closes said chamber when said catch abuts said proximal stop along an annular abutment line and said bearing zones abut each other along an annular bearing line.

26. The sealing device according to claim 21, wherein said central body and said skirt are obtained from a single piece of metal.

27. The sealing device according to claim 1, wherein when the bearing zones are in a mutual abutment an annular yieldable portion of the second coupling component abuts a proximal stop of the central body.

28. The sealing device according to claim 27, wherein said yieldable portion is a deformable annular lip formed on a bore of the second coupling component.

29. The sealing component according to claim 27, wherein an annular chamber is formed between said skirt and said central body and encloses said first coupling component and resilient return means urging said first coupling component towards said second component, and wherein said second coupling component sealingly closes said chamber when said yieldable portion abuts said proximal stop along an annular abutment line and said bearing zones abut each other along an annular bearing line.

30. A sealing device comprising a plug intended to be placed in a threaded hole, or removed therefrom, respectively by screwing and unscrewing, the plug comprising:
   a central body provided with a screw thread,
   locking and unlocking means opposing spontaneous unscrewing of the plug, automatically activated by the rotation of the plug and its corresponding movement in the direction of screwing along a longitudinal axis, the locking and unlocking means comprising a first releasable coupling component coupled for common rotation with the central body and a second coupling component which can be immobilized in rotation with respect to the threaded hole during screwing,
   wherein the second coupling component has a central bore provided with a catch and is mounted by an insertion of said screw thread through said bore followed by a displacement of said catch into a retaining position in which said catch precludes reverse movement of said screw thread out of said bore.

31. The sealing device according to claim 30, wherein said catch is a plastically deformable lip.

32. The sealing device according to claim 30, wherein said displacement of said catch is produced on termination of said insertion by an abutment of said catch against a proximal stop which is fast with said central body.

33. The sealing device according to claim 32, wherein said displacement of said catch is limited by said second coupling component abutting a bearing zone which is rigidly connected to said central body.

34. A releasable self-locking device in the form of a plug including a first threaded element, the device resisting untimely unscrewing of a screw connection between the first threaded element and a second correspondingly threaded element, the device further comprising:
   first and second releasable coupling components mounted onto the first threaded element, said first releasable coupling component being coupled for common rotation with the first threaded element and said second coupling component being supported for axial displacement on the first threaded element and free rotation on the first and second threaded elements when the first threaded element is engaged with the second threaded element, the second coupling component immobilized against rotation with respect the second threaded element during screwing of the first and second elements, and
   a resilient return means axially biasing the first releasable coupling component into engagement with the second releasable coupling component and consequently biasing the second coupling component into axial engagement with a distal stop of the first threaded element or, when a certain amount of screwing has been performed, against the second threaded element,
   wherein the first threaded element is provided with a proximal stop limiting axial movement of the second coupling component in a direction away from the distal stop.

35. The self-locking device according to claim 34, wherein the second coupling component comprises a radial protrusion having two opposed faces for engagement of the distal stop and of the proximal stop, respectively.

36. The self-locking device according to claim 35, wherein the radial protrusion is given its operative shape by a plastic deformation against said proximal stop under an axial thrust, said radial protrusion being before said plastic deformation able to move beyond said distal stop.

37. The self-locking device according to claim 34, wherein said second coupling component is operable as a distance part between the two threaded elements when they are tightened against each other by screwing.

38. The self-locking device according to claim 37, wherein an abutment of the second coupling component against the proximal stop has a flexibility which is limited by a rigid abutment of the second coupling component onto a bearing zone of the first element when the second coupling component operates as said distance part.

39. The self-locking device according to claim 37, wherein said first threaded element is provided with a blind annular chamber containing the resilient return means and the first coupling component, and wherein the second coupling component is capable of closing said chamber when the second coupling element is in contact with the first threaded element at the proximal stop along an annular inner edge of said chamber and in at a bearing zone provided along an annular outer edge of said chamber.

40. The self-locking device according to claim 39, wherein said chamber is formed between a central body and a skirt of the first coupling element, said central body and said skirt formed together from a single piece of metal.

41. A releasable self-locking screw connection device adapted for resisting unwanted unscrewing, said screw connection comprising a first threaded element and a second correspondingly threaded element, the first element comprising:
a central body provided with a screw thread,
a skirt rigidly connected to the central body and having an annular bearing zone capable of transmitting tightening thrust to the second threaded element,
an annular chamber formed between the skirt and the central body and opening towards the screw thread,
locking and unlocking means opposing spontaneous unscrewing of the plug, said locking and unlocking means mounted at least partly inside the chamber and automatically activated by the rotation of the plug and its corresponding movement in the direction of screwing along a longitudinal axis, said locking and unlocking means comprising a first releasable coupling component coupled for common rotation with the central body and a second releasable coupling component which is rotatable and captive onto said central body and provided with a means of immobilization against rotation with respect to the second threaded element during screwing,
wherein the skirt bears against the second releasable coupling component to transmit tightening thrust to the second threaded element.

42. A releasable self-locking screw connection device according to claim 41, wherein the first coupling component is coupled for common rotation with the central body via guide means configured on the periphery of the first component and extending radially with respect to said longitudinal axis, said guide means entering respectively corresponding grooves configured inside the skirt, which extend parallel to the longitudinal axis so as to allow axial displacement of the first component inside the skirt.

43. The device according to claim 41, wherein the first component is movable with respect to the central body along the longitudinal axis, between the second component and an inner base of the skirt, the first component being urged towards the second component by resilient return means housed in the skirt.

44. The device according to claim 43, wherein the central body comprises a distal axial stop against which the second component abuts at a distal extremity of a stroke of said second component, under the force of the first component urged by the resilient return means.

45. The sealing device according to claim 44, wherein the distal axial stop is constituted by a collar machined on the central body.

46. The sealing device according to claim 43, wherein the resilient return means are constituted by a flat wire wave compression spring.

47. The sealing device according to claim 41, wherein the second component is provided with a shaped element adapted to engage a corresponding formation provided on the case thereby to cause immobilization of the second component with respect to the case when the plug is being screwed in the threaded hole.

48. The sealing device according to claim 41, wherein the first component and the second component comprise respective sets of teeth intended to engage each other during screwing/unscrewing.

49. The device according to claim 41, wherein the skirt bearing zone transmits the tightening pressure to the second threaded element via the second coupling component operable as a distance part between the skirt and the second threaded element.

50. A releasable self-locking screw connection device adapted for resisting unwanted unscrewing, said screw connection comprising a first threaded element and a second correspondingly threaded element, the first element comprising:
a central body provided with a screw thread,
a skirt rigidly connected to the central body and having an annular bearing zone capable of transmitting tightening thrust to the second threaded element,
an annular chamber formed between the skirt and the central body and opening towards the screw thread,
locking and unlocking means opposing spontaneous unscrewing of the plug, said locking and unlocking means mounted at least partly inside the chamber and automatically activated by the rotation of the plug and its corresponding movement in the direction of screwing along a longitudinal axis, said locking and unlocking means comprising a first releasable coupling component coupled for common rotation with the central body via guide means configured on the periphery of the first component and extending radially with respect to said longitudinal axis, and a second releasable coupling component captive on the central body, said guide means entering respectively corresponding grooves configured inside the skirt, which extend parallel to the longitudinal axis so as to allow axial displacement of the first component inside the skirt,
wherein the skirt bears against the second releasable coupling component to transmit tightening thrust to the case.

* * * * *

UNITED STATES PATENT AND TRADEMARK OFFICE
CERTIFICATE OF CORRECTION

| | |
|---|---|
| PATENT NO. | : 9,574,599 B2 |
| APPLICATION NO. | : 14/033975 |
| DATED | : February 21, 2017 |
| INVENTOR(S) | : Damien Marc |

It is certified that error appears in the above-identified patent and that said Letters Patent is hereby corrected as shown below:

On the Title Page

Column 1, Assignee, reads "JPB Systeme, Brie-Conte-Robert (FR)" and should read -- JPB Systeme, Montereau sur le Jard (FR) --.

In the Specification

Column 5, Line 38, reads "immobilized against rotation with respect the second" and should read -- immobilized against rotation with respect to the second --.

Column 5, Lines 55-56, read "being before said plastic deformation able to move beyond said distal stop" and should read -- being, before said plastic deformation, able to move beyond said distal stop --.

Column 6, Line 5, reads "said chamber and in at a bearing zone" and should read -- said chamber and at a bearing zone --.

Column 11, Line 21, reads "With reference to FIG. 6-10, a third" and should read -- With reference to FIGS. 6-10, a third --.

Column 12, Line 22, reads "each other so that short after the catch" and should read -- each other so that shortly after the catch --.

In the Claims:

Claim 34
Column 16, Line 23, reads "immobilzed against rotation with respect the second" and should read -- immobilized against rotation with respect to the second --.

Signed and Sealed this
Eleventh Day of April, 2017

Michelle K. Lee
*Director of the United States Patent and Trademark Office*

CERTIFICATE OF CORRECTION (continued)
U.S. Pat. No. 9,574,599 B2

Claim 36
Column 16, Line 45, reads "being before said plastic deformation able to move beyond said distal stop" and should read -- being, before said deformation, able to move beyond said distal stop --.

Claim 39
Column 16, Line 63, reads "edge of said chamber and in at a bearing zone provided" and should read -- edge of said chamber and at a bearing zone provided --.